United States Patent [19]

Tomat et al.

[11] Patent Number: 5,665,044
[45] Date of Patent: Sep. 9, 1997

[54] ROLLING ROLL WITH ROLLING RINGS

[75] Inventors: Ferruccio Tomat, Udine; Roberto Canzutti, Pavia Di Udine, both of Italy

[73] Assignee: Danieli & C. Officine Meccaniche SpA, Buttrio, Italy

[21] Appl. No.: 483,703

[22] Filed: Jun. 7, 1995

[30] Foreign Application Priority Data

Jun. 29, 1994 [IT] Italy ............... UD94A0112

[51] Int. Cl.⁶ ............................................. B23P 15/00
[52] U.S. Cl. ............................ 492/47; 492/1; 492/45
[58] Field of Search .................... 492/45, 1, 21, 492/27, 38, 47; 72/199

[56] References Cited

U.S. PATENT DOCUMENTS

| | | | |
|---|---|---|---|
| 4,114,416 | 9/1978 | Bier et al. | 492/1 |
| 4,208,147 | 6/1980 | Guge et al. | 492/1 |
| 4,813,113 | 3/1989 | Wykes et al. | 492/1 |
| 4,817,410 | 4/1989 | Yatsuzuka et al. | 492/1 |
| 4,881,310 | 11/1989 | Wykes et al. | 492/1 |
| 5,177,867 | 1/1993 | Danielsson | 492/45 |
| 5,483,812 | 1/1996 | Dempsey | 492/1 |
| 5,533,374 | 7/1996 | Sto et al. | 492/1 |

FOREIGN PATENT DOCUMENTS

| | | | |
|---|---|---|---|
| 040808 | 5/1981 | European Pat. Off. | B21B 27/02 |
| 214521 | 8/1986 | European Pat. Off. | B21B 31/10 |
| 9207668 | 3/1991 | WIPO | B21B 27/02 |

OTHER PUBLICATIONS

Soviet Inventions Illustrated, Sec. CH. Week, X38, Derwent Publs. Class M 21 & SU A 495 110 (Magn. Metal Mining) Mar. 1976 Abstract.

*Primary Examiner*—Irene Cuda
*Attorney, Agent, or Firm*—Antonelli, Terry, Stout & Kraus, LLP

[57] ABSTRACT

A rolling roll with rolling ring which includes a pair of supporting half-shafts, which cooperate with each other and are suitable for the keying of the relative rolling ring. The keying is carried out substantially at the zone of cooperation between the half-shafts, the half-shafts (12a–12b) being set in traction against each other by means of a tie rod. The cooperation between the two half-shafts is obtained with a tapered coupling of a male/female type of the half-shafts to each other, this male/female coupling providing a zone of superimposing of terminal portions (12a–12b) of the half-shafts (12a–12b), this zone covering at least an important part of the axial extent of the rolling ring.

5 Claims, 1 Drawing Sheet

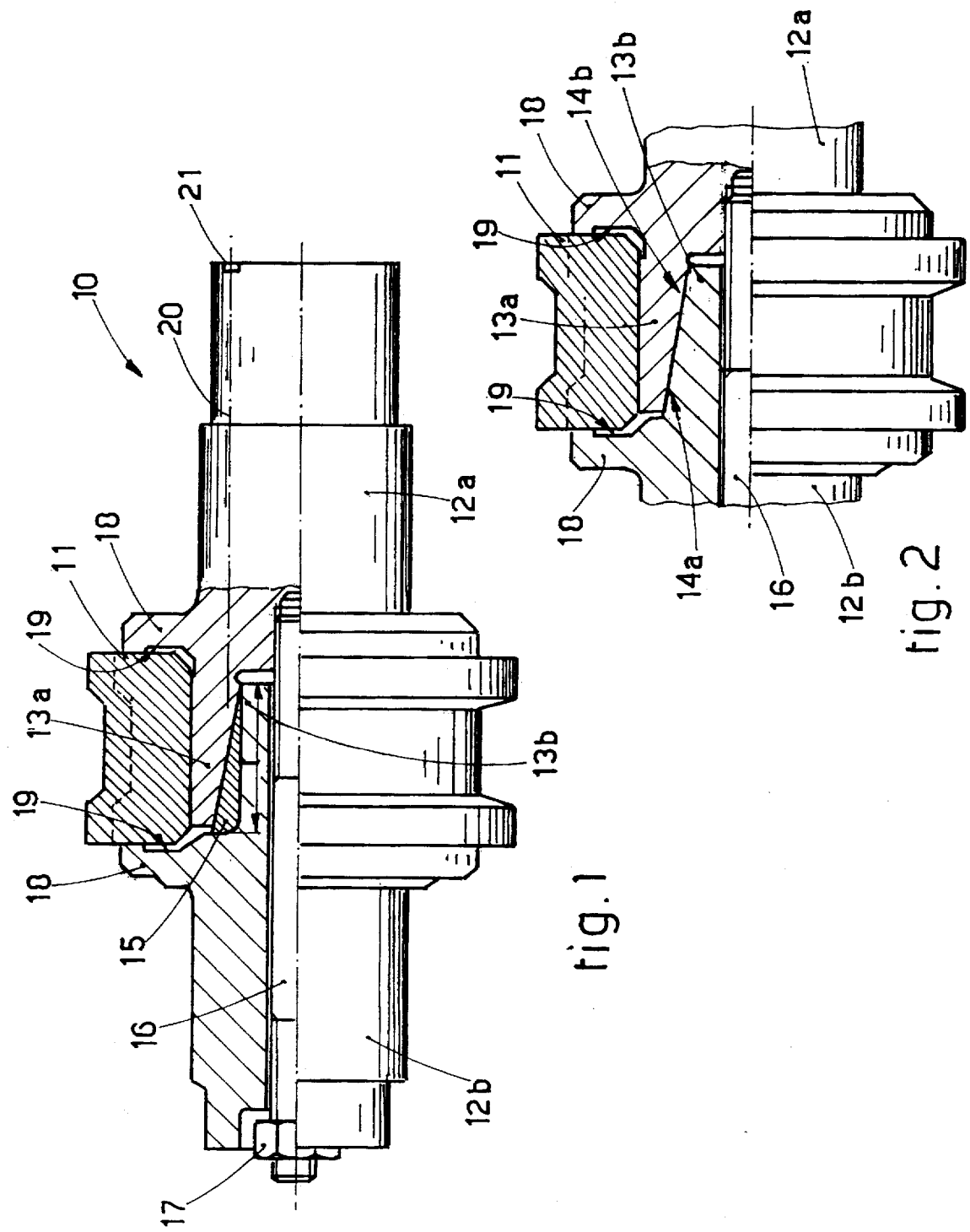

ROLLING ROLL WITH ROLLING RINGS

BACKGROUND OF THE INVENTION

This invention concerns a system to install the rolling rings on a rolling roll.

To be more exact, the system according to the invention is used to install the rolling rings, which generally but not only are made of cast iron, on the relative supporting half-shafts.

The invention is applied in particular but not only to rolling mill stands for single-channel roughing rolling with box passes or diamond passes.

In rolling mill stands of the state of the art and, in particular, in universal rolling mill stands a procedure of keying the rolling rings to a pair of half-shafts, which are coupled together and face each other substantially at the centre line of the relative rolling ring, has been disclosed.

These half-shafts are generally kept under tension by pre-loaded tie rods inserted coaxially into the half-shafts.

These pre-loaded tie rods ensure a union between the half-shafts in each working step and also transmission of the torque.

The half-shafts include lateral flanges which cooperate by contact with the lateral surfaces of the rolling rings.

The torque is transmitted by friction through these flanges to the rolling rings.

The systems disclosed in the state of the art for the coupling of the half-shafts involve some drawbacks, especially as regards the deflections under load which take place in general in all the rolling steps and which may be especially damaging in the event of severe working conditions.

According to the installation system of the state of the art the half-shafts are kept reciprocally under tension by pre-loaded tie rods, but no type of reciprocal support is created between one half-shaft and the other half-shaft.

In particular, at the centre line of the rolling rings, where the transverse deflection under load takes on the highest values, there is a zone of coupling of the two half-shafts which coincides with the zone of less resistance to stresses applied in a direction perpendicular to the axis of the half-shafts themselves.

Another drawback often encountered in installation systems of this type concerns the rapid wear to which the parts of reciprocal cooperation of the half-shafts are subjected, namely the relative inner ends.

This rapid wear involves frequent corrective work on important parts of the half-shafts, long times for dismantling the elements to be maintained, the use of a labour force and still other problems.

Moreover, in view of the considerable cost and effort required, this corrective work often tends to be postponed, thereby entailing working conditions which are not always the best.

SUMMARY OF THE INVENTION

The present applicants have designed, tested and embodied this invention to overcome all the shortcomings subject to complaints in the state of the art and to achieve further advantages in view of the urgent requests received in this connection from persons working in this field.

The purpose of this invention is to achieve a system for installation of the rolling rings on the relative supporting half-shafts which is suitable to ensure considerable resistance to the deflections under load, particularly in the zones where the maximum stresses take place in a direction transverse to the axis of the half-shafts themselves.

Another purpose is to employ an auxiliary intermediate element for the coupling of the two half-shafts, onto which auxiliary element is discharged a great part of the rolling stresses, this element therefore in this case being the element most subject to wear and consisting of an element which can be readily and economically maintained or replaced.

Furthermore, according to the invention a mechanical continuity is obtained between the two half-shafts just as if they consisted of one single shaft.

According to the invention the two half-shafts to which the rolling ring is keyed are caused to cooperate together by means of a male/female coupling.

In other words, the inner terminal part of the half-shaft acting as a male element is coupled to the inner terminal part of the half-shaft acting as a female element so as to determine an at least partial superimposing of the two terminal parts so as to create mechanical continuity.

According to the invention this superimposing covers advantageously the greater part of the axial extent of the rolling ring; this Situation leads to a considerable increase of the resistance to transverse stresses, especially in the zones most subjected to deflections under load.

According to the invention the coupling between the two half-shafts is of a tapered type; in other words, the two terminal parts of the half-shafts which are inserted into each other have a tapered conformation of a mating type so as to ensure a tapered engagement.

According to a preferred embodiment of the invention a tapered sleeve suitable to withstand the deflections and stresses under load which are caused during the rolling is placed between the two terminal portions of the half-shafts and substantially along the whole zone of the superimposing of these terminal portions.

This tapered sleeve prevents direct contact between the coupled surfaces of the half-shafts, thus obviating wear and deformations of those parts.

This wear and the deformations arising from the stresses and deflections under load are therefore mostly transferred onto the tapered sleeve, which, however is an element which can be readily and economically maintained and replaced.

BRIEF DESCRIPTION OF THE INVENTION

The attached figures are given as a non-restrictive example and show two preferred embodiments of the invention as follows:

FIG. 1 shows a half section/half view of a preferred form of embodiment of the invention;

FIG. 2 shows a part of a variant of FIG. 1.

DETAILED DESCRIPTION OF THE PREFERRED EMBODIMENT

A rolling roll 10, of which the essential parts are shown in FIG. 1, includes a rolling ring 11 that is keyed to a pair of half-shafts 12, namely a righthand half-shaft 12a and a lefthand half-shaft 12b respectively.

The description in this case concerns a rolling roll 10 having a horizontal axis, but the same considerations are applicable also where the rolling roll has a vertical axis, in which case it will be necessary to take into consideration an upper half-shaft and a lower half-shaft.

According to the invention the two half-shafts 12a–12b are coupled together with a male/female coupling of a tapered type.

In this case, in particular, the inner terminal part 13b of the lefthand half-shaft 12b acting as a male element is coupled to the inner terminal part 13a of the righthand half-shaft 12a acting as a female element so as to define a zone of superimposing and reciprocal support having an axial length "l".

This zone of superimposing covers advantageously the greater part of the axial extent of the rolling ring 11 so as to create a zone of high resistance to transverse stresses and to deflections under load.

So as to provide the tapered coupling, a first embodiment of the invention shown in FIG. 2 arranges that the cooperating surfaces 14a and 14b of the two half-shafts 12a–12b have a mating tapered conformation so as to be able to obtain the desired coupling.

According to the preferred embodiment of FIG. 1 a tapered sleeve 15 suitable to withstand the deflections under load and the transverse stresses during working is placed between the coupled terminal parts 13a–13b of the relative half-shafts 12a–12b.

The tapered sleeve 15 is an element which can be readily and economically maintained and/or replaced and therefore enables working conditions to be ensured which are always substantially the best.

This tapered sleeve 15 is keyed advantageously in this case to the inner terminal part 13b of the lefthand half-shaft 12b, an injection of oil being made available to assist.

According to a variant a conduit 20 is provided which communicates with an attachment 21 positioned on the drive side of the rolling roll 10 so as to feed and replenish the oil for keying of the tapered sleeve 15 to the relative half-shaft 12b.

According to the invention the union and constant engagement during all the working steps, the recovery of the play due to the taper and the transmission of the motive torque between the two half-shafts 12a–12b are ensured by a hydraulically pre-loaded tie rod 16 extending along the axis of the two half-shafts 12a–12b.

This tie rod 16 is clamped in this case at the outer end of the lefthand half-shaft 12b by a clamping nut 17 and is screwed onto the righthand half-shaft 12a so as to cause a loading to the desired tension between two half-shafts 12.

The half-shafts 12a–12b include respective lateral flanges 18 with which there cooperate by contact the lateral surfaces 19 of the rolling ring 11.

These lateral flanges 18 are shaped in such a way as to ensure in each step a constant contact with the lateral surfaces 19, thus providing by friction a transmission of the torque to the rolling ring 11.

We claim:

1. A rolling roll with rolling ring, comprising a pair of supporting half-shafts (12a–12b), which cooperate with each other and are suitable for the keying of the relative rolling ring, the keying being carried out substantially at the zone of cooperation between the half-shafts (12a–12b), the half-shafts being set in traction against each other by means of a tie rod the system being characterised in that the cooperation between the two half-shafts is obtained with a tapered coupling of a male/female type of the half-shafts to each other, this male/female coupling providing a zone of superimposing of terminal portions of the half-shafts, this zone covering at least an important part of the axial extent of the rolling ring.

2. A rolling roll with rolling ring as in claim 1, in which the zone of superimposing of the terminal portions of the half-shafts covers substantially the whole axial extent of the rolling ring.

3. A rolling roll with rolling ring as in claim 1, in which a tapered sleeve keyed to the terminal part of the half-shaft acting as a male element is included in an intermediate position between the coupling surfaces of the half-shafts, this position covering substantially the greater part of the zone of superimposing of the two coupling surfaces.

4. A rolling roll with rolling ring as in claim 3, in which the tapered sleeve is keyed with the assistance of an injection of oil.

5. A rolling roll with rolling ring as in claim 1, in which the tie rod is pre-loaded hydraulically.

* * * * *